United States Patent [19]

Uno et al.

[11] Patent Number: 4,830,158

[45] Date of Patent: May 16, 1989

[54] GEAR SYNCHRONIZER ASSEMBLY FOR POWER TRANSMISSION

[75] Inventors: Makoto Uno; Kazuhito Ikemoto; Yukio Terakura, all of Toyota, Japan

[73] Assignee: Toyota Jidosha Kabushiki Kaisha, Toyota, Japan

[21] Appl. No.: 74,033

[22] Filed: Jul. 16, 1987

[30] Foreign Application Priority Data

Jul. 21, 1986 [JP] Japan .................... 61-111672[U]

[51] Int. Cl.$^4$ .................................... F16D 23/06
[52] U.S. Cl. ..................................... 192/53 F; 74/339
[58] Field of Search ............... 192/53 F, 53 A, 53 E; 74/339

[56] References Cited

U.S. PATENT DOCUMENTS

| | | | |
|---|---|---|---|
| 2,179,568 | 11/1939 | White | 192/53 F |
| 4,625,844 | 12/1986 | Ikemoto et al. | 192/53 F |
| 4,674,614 | 6/1987 | Ikemoto et al. | 192/53 F |

FOREIGN PATENT DOCUMENTS

| | | | |
|---|---|---|---|
| 195519 | 9/1986 | European Pat. Off. | 192/53 F |
| 554047 | 1/1957 | Italy | 192/53 F |
| 554048 | 1/1957 | Italy | 192/53 F |
| 55-100428 | 7/1980 | Japan | 192/53 F |

Primary Examiner—Rodney H. Bonck
Assistant Examiner—Richard M. Lorence
Attorney, Agent, or Firm—Oblon, Fisher, Spivak, McClelland & Maier

[57] ABSTRACT

A gear synchronizer assembly includes a clutch sleeve formed at its inner periphery with an internal radial projection, and a radially contractible annular resilient member supported by engagement with the inner circumference of an outer cylindrical hub portion of a hub member fixed to a transmission shaft. The resilient member has an axial leg extending therefrom toward the internal radial projection of the clutch sleeve and having a radial projection which is arranged to be engaged with the internal radial projection in shifting operation of the clutch sleeve toward a spline piece and arranged to abut against and urge a synchronizer ring toward the spline piece upon engagement with the internal radial projection of the clutch sleeve thereby to effect frictional engagement between the synchronizer ring and spline piece. The annular resilient member is further formed with at least one retainer lug which extends therefrom in an axial direction toward an annular body portion of the hub member and inserted into an axial hole in the annular body portion of the hub member to retain the resilient member in place in a circumferential direction.

2 Claims, 3 Drawing Sheets 4,830,158

GEAR SYNCHRONIZER ASSEMBLY FOR POWER TRANSMISSION

BACKGROUND OF THE INVENTION

1. Field of the Invention

The present invention relates to a gear synchronizer assembly for power transmissions, and more particularly, but not exclusively, to a gear synchronizer assembly of the type which comprises a gear member rotatable on a transmission shaft, a spline piece mounted on a hub portion of the gear member for rotation therewith and being formed at one side thereof with a conical portion and thereon with external spline teeth, a synchronizer ring mounted on the conical portion of the spline piece for frictional engagement therewith, a hub member fixedly mounted on the transmission shaft for rotation therewith and being formed thereon with external spline teeth, a clutch sleeve encircling the hub member and having internal spline teeth in continual engagement with the external spline teeth of the hub member, the clutch sleeve being axially shiftable to be engaged at the internal spline teeth thereof with the external spline teeth of the spline piece, and thrust means for thrusting the synchronizer ring toward the gear member in shifting operation of the clutch sleeve to effect frictional engagement between the synchronizer ring and the spline piece.

2. Discussion of the Background

In such a conventional gear synchronizer assembly as described above, the thrust means comprises a plurality of circumferentially spaced strut keys each having a raised portion in engagement with the corresponding recess in the inner peripheral wall of the clutch sleeve, and an annular retainer spring arranged to bias the strut keys radially outwardly for engagement with the clutch sleeve. To simplify the thrust means in construction, there has been proposed an improved thrust means wherein the strut keys and retainer spring are replaced with a single thrust element. It is, however, difficult to enhance productivity of the gear synchronizer assembly because the single thrust element is complicated in configuration and construction.

To overcome the shortcomings of such a conventional thrust means as described above, an improved gear synchronizer assembly has been proposed by Ikemoto et al. in U S. Pat. No. 4,625,844, issued on Dec. 2, 1986, wherein the clutch sleeve is formed at its inner periphery with at least one internal radial projection, and wherein the thrust means comprises a radially contractible annular resilient member supported in place by engagement with the inner circumference of an outer cylindrical hub portion of the hub member, the annular resilient member having an axial leg extending therefrom toward the internal radial projection of the clutch sleeve and having a radial projection arranged to be brought into engagement with the internal radial projection of the clutch sleeve and arranged to abut against and urge the synchronizer ring toward the spline piece upon engagement with the internal radial projection of the clutch sleeve, the axial leg of the annular resilient member being arranged to be compressed radially inwardly by engagement with the internal radial projection of the clutch sleeve.

In the above-described synchronizer assembly, it is required to accurately position the axial leg of the annular resilient member for engagement with the internal radial projection of the clutch sleeve so as to ensure reliable operation of the synchronizer assembly. In the process of assembly of the synchronizer assembly, however, there is a fear that the axial leg of the annular resilient member may not be arranged in a proper position. Additionally, if the axial leg of the annular resilient member is vibrated by an impact acting thereon during travel of the vehicle, it will be displaced from its proper position.

SUMMARY OF THE INVENTION

It is, therefore, a primary object of the present invention to provide an improved gear synchronizer assembly wherein the axial leg of the annular resilient member is accurately positioned for engagement with the internal radial projection of the clutch sleeve and retained in place without causing displacement thereof in a circumferential direction eve when applied with an impact during travel of the vehicle.

According to the present invention, the primary object is attained by providing a gear synchronizer assembly wherein the annular resilient member is further formed with at least one retainer lug which extends therefrom toward an annular body portion o the hub member and is inserted into an axial hole in the annular body portion of the hub member to retain the resilient member in place in a circumferential direction.

BRIEF DESCRIPTION OF THE DRAWINGS

Additional objects, features and advantages of the present invention will be readily appreciated from the following detailed description of a preferred embodiment thereof when considered with reference to the accompanying drawings, in which.

DESCRIPTION OF THE PREFERRED EMBODIMENT

Figure 1:
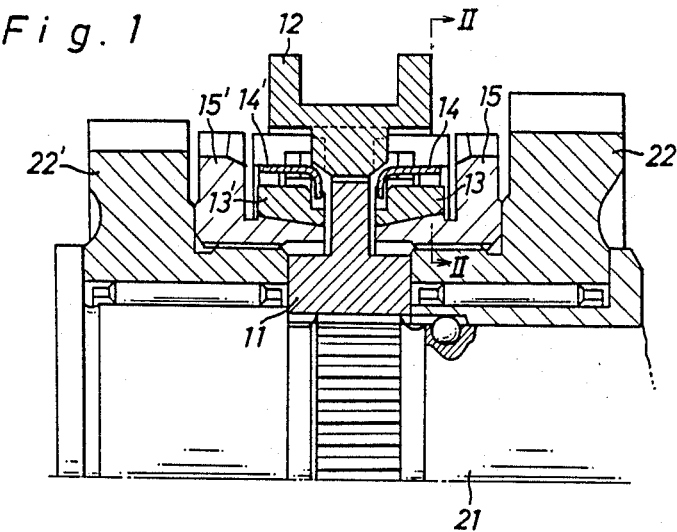
FIG. 1 illustrates in cross-sectional form one of circumferentially equi-spaced parts of a gear synchronizer assembly in accordance with the present invention.
Figure 2:
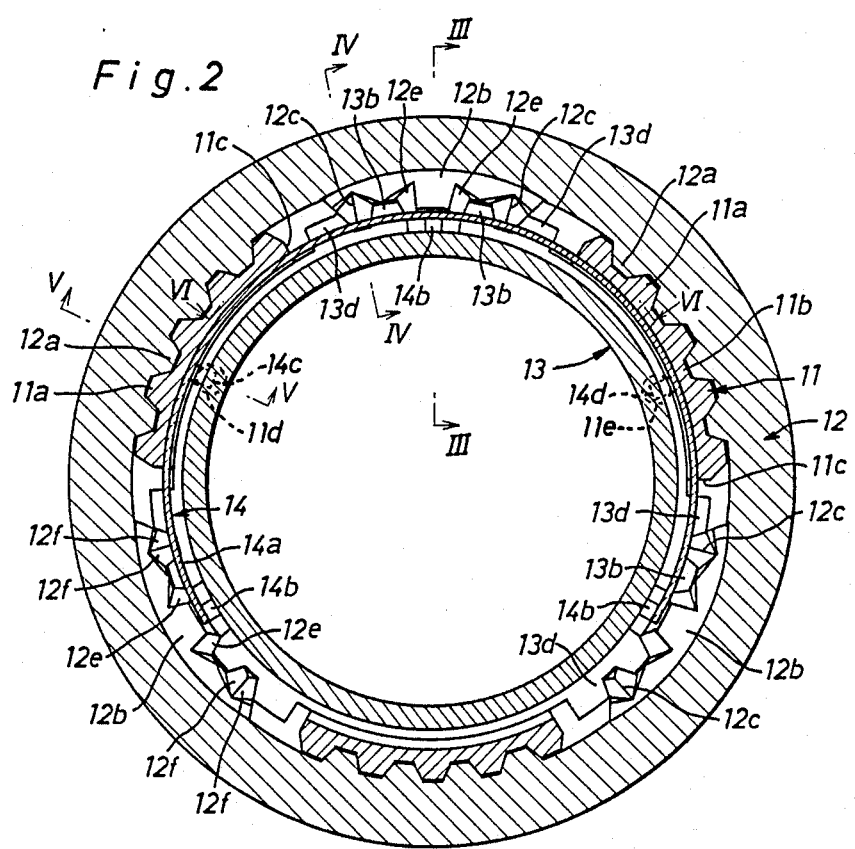
FIG. 2 is a cross-sectional view taken along line II—II in FIG. 1.

Referring now to the drawings, wherein like reference numerals represent the same or corresponding parts throughout the figures, there is illustrated, in FIG. 1, a transmission shaft 21, on which are rotatably supported a pair of change-speed gears 22 and 22'. Disposed between the change-speed gears 22 and 22' is a pair of synchronizer assemblies which are operable to cause selective speed synchronization between the shaft and the gears 22 and 22', respectively. As is illustrated in FIGS. 1 and 2, the synchronizer assemblies have a common hub assembly which includes a hub member 11, and thrust means in the form of each of a pair of radially contractible annular resilient members 14, 14'. The synchronizer assemblies are arranged to be operated through a clutch sleeve 12 which is connected by a yoke groove to a conventional manually operated shift mechanism (not shown). The hub member 11 is fixedly mounted at its inner hub portion on the transmission shaft 21 by means of a spline connection for rotation therewith. As can be well seen in FIGS. 2 and 5, the hub member 11 is integrally formed with an outer cylindrical hub portion 11b which is formed thereon external spline teeth 11a. The clutch sleeve 12 is arranged in surrounding relationship with the outer cylindrical hub portion 11b of hub member 11 and has internal spline teeth 12a in continual engagement with the external spline teeth 11a of hub member 11. The clutch sleeve 12 is axially shiftable to be engaged at the internal spline teeth thereof with external spline teeth 15b of a spline piece 15.

The left-hand synchronizer assembly is substantially the same as the right-hand synchronizer assembly such that a detailed description of the right-hand synchronizer assembly only is believed necessary. It is identified in the figure with the same reference numbers as for the right-hand synchronizer assembly, except that the corresponding reference numbers for the left-hand synchronizer assembly are identified with a "prime" symbol. The right-hand synchronizer assembly includes the spline piece 15 and a synchronzer ring 13. The spline piece 15 is fixedly mounted on a hub portion of changespeed gear 22 by means of a spline connection for rotation therewith. The spline piece 15 is formed at its left end with a conical portion 15a and thereon with the external spline teeth 15b which are chamfered at each end thereof. The synchronizer ring 13 is rotatably and axially slidably mounted on the conical portion 15a of spline piece 15 and has an internal conical surface 13a a for frictional engagement with the surface of the conical portion 15a of spline piece 15. Thus, the synchronizer ring 13 cooperates with the spline piece 15 to provide a friction clutch in a well-known manner.

In this embodiment, the outer cylindrical hub portion 11b of hub member 11 is axially recessed in its circumferentially equi-spaced three portions. As can be well seen in FIGS. 2, 3 and 4, the axially recessed portions each are formed as an axial groove 11c. The clutch sleeve 12 is formed at its inner periphery with circumferentially equi-spaced three internal radial projections 12b of large width which are axially shiftable in the axial grooves 11c of hub member 11. The clutch sleeve 12 is further formed at its inner periphery with a pair of internal radial projections 12c of small width which are arranged at opposite sides of the respective large width radial projections 12b.

Figure 3:
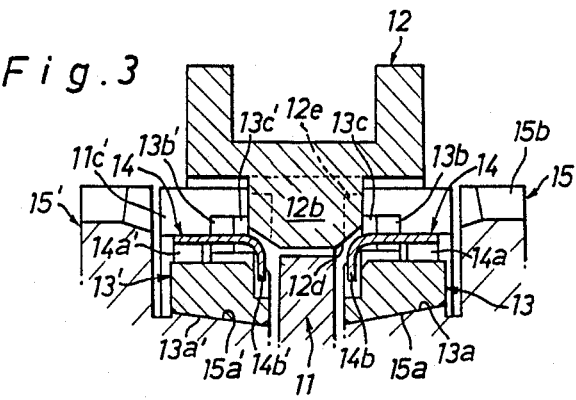
FIG. 3 is an enlarged cross-sectional view taken along line III—III in FIG. 2.
Figure 4:
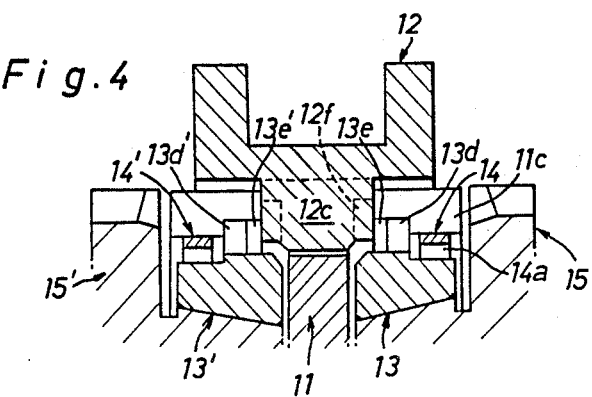
FIG. 4 is an enlarged cross-sectional view taken along line IV—IV in FIG. 2.
Figure 6:
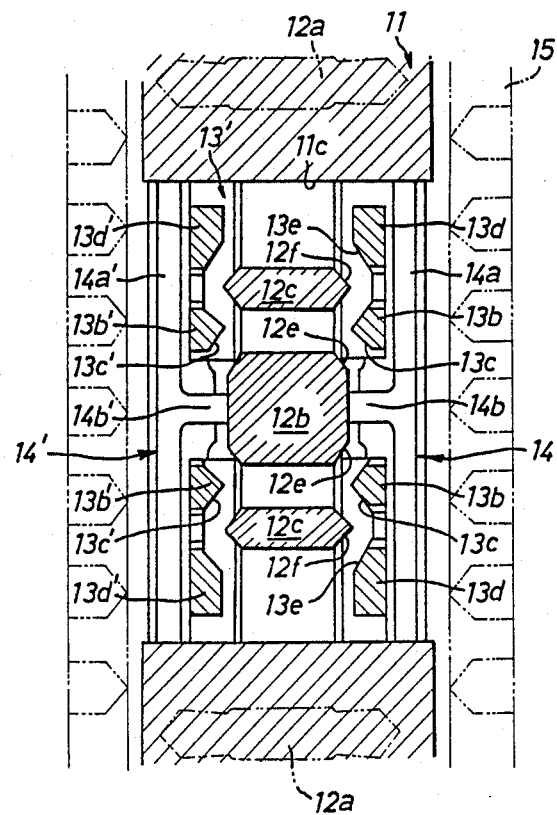
FIG. 6 is an enlarged partial view taken along line VI—VI in FIG. 2, showing the relative positions of the clutch sleeve, the synchronizer ring and the spline piece illustrated in FIGS. 1 to 5.

As can be well seen in FIGS. 3 and 6, the large width radial projections 12b each are formed at their inner end corners with tapered surfaces 12d and at their side corners with chamfers 12e. The large width radial projections 12b are respectively arranged between a pair of raised portions 13b which are integrally formed on the synchronizer ring 13 and circumferentially equi-spaced. The raised portions 13b each are formed at their inner ends with a pair of chamfers 13c which are engageable with the chamfers 12e of large width radial projections 12b, respectively. As can be well seen in FIGS. 4 and 6, the small width radial projections 12c each are formed at their opposite ends with chamfers 12f and are arranged between the raised portion 13b and another raised portion 13d formed on the synchronizer ring 13 adjacent the respective raised portions 13b. The raised portions 13d each are formed at their inner ends with a chamfer 13e which is engageable with the chamfer 12f of small width radial projection 12c.

As can be well seen in FIGS. 2 and 3, the radially contractible annular resilient member 14 includes a C-letter shaped ring portion 14a which is formed at opposite ends thereof with a pair of axial legs 14b and at an intermediate portion thereof with an axial leg 14b. The ring portion 14a of resilient member 14 is formed larger in diameter than the inner circumference of outer cylindrical hub portion 11b of hub member 11 and supported in place by engagement with the inner circumference of hub portion 11b in the presence of a radial force imposed thereto. The axial legs 14b of resilient member 14 each extend from the ring portion 14a toward the internal radial projection 12b of clutch sleeve 12 through an axial space between the raised portions 13b and 13b of synchronizer ring 13. The axial legs 14b of resilient member 14 each are formed with a radial projection which is arranged between the inner end surface of synchronizer ring 13 and the tapered surface 12d of the internal radial projection 12b of clutch sleeve 12. (see FIG. 3)

Figure 5:
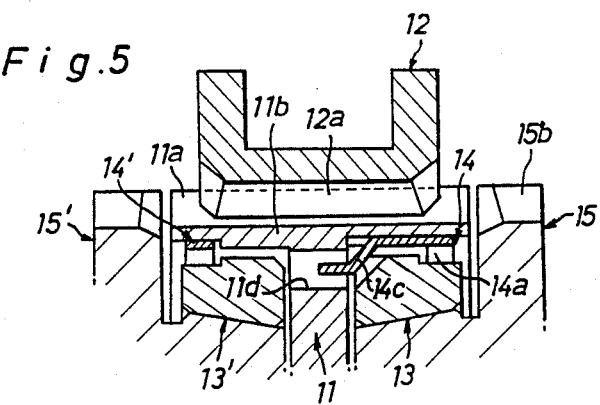
FIG. 5 is an enlarged cross-sectional view taken along line V—V in FIG. 2.

As can be well seen in FIGS. 2 and 5, the annular resilient member 14 is further formed at its ring portion 14a with circumferentially spaced retainer lugs 14c and 14d which are each located between the axial legs 14b of resilient member 14 and extend in an axial direction toward an annular body portion of hub member 11. For engagement with the retainer lugs 14c and 14d of resilient member 14, the hub member 11 is formed at its annular body portion with circumferentially spaced axial holes 11d and 11e. As shown in FIG. 5, the retainer lug 14c of resilient member 14 is inserted into the axial hole 11d in hub member 11, and as shown in FIG. 2, the retainer lug 14d is inserted into the axial hole 11e in hub member 11. Thus, the resilient member 14 is retained in place by engagement with the annular body portion of hub member 11 at the retainer lugs 14c and 14d thereof so that the axial legs 14b of resilient member 14 are accurately positioned to oppose the large width radial projections 12b of clutch sleeve 12 at their radial projections.

In shifting operation of the clutch sleeve 12 toward the spline piece 15, the axial legs 14b of resilient member 14 are slightly moved in an axial direction by engagement with the tapered surfaces 12d of large width radial projections 12b at their inner shoulders such that each radial projection of axial legs 14b abuts against and urges the synchronizer ring 13 toward the spline piece 15 which will effect frictional engagement of the internal conical surface 13a of synchronizer ring 13 and the surface of the conical portion 15a of spline piece 15. Simultaneously, the axial movement of clutch sleeve 12 will be resisted by balk action or engagement between the chamfers 12e, 12f of large and small width radial projections 12b and 12c and the chamfers 13c, 13e of raised portions 13b and 13d. When the thrust pressure acting on resilient member 14 exceeds a predetermined value, synchronization between the relative rotating parts is established, and the large width radial projections 12 of clutch sleeve 12 ride over the axial legs 14b of resilient member 14 thereby compressing them radially inwardly. This permits the radial projections 12b, 12c of clutch sleeve 12 to pass through axial grooves respectively formed between the raised portions 13b and 13d of synchronizer ring 13. Thus, the internal splines 12a of clutch sleeve 12 will be brought into engagement with the external spline teeth 15b of spline piece 15 to accomplish the synchronization.

From the above description, it will be understood that the gear synchronizer assembly is characterized by provision of the clutch sleeve 12 which is integrally formed at its inner periphery with the circumferentially equi-spaced large and small width radial projections 12b and 12c to be engaged at their chamfered ends 12e, 12f with the chamfers 13c, 13e of raised portions 13b and 13d on synchronizer ring 13. With this arrangement, it is advantageous that even if the number of large width radial projections 12b is reduced to form a sufficient number of internal spline teeth on the clutch sleeve 12 for reliable torque transmission, the small width radial projections 12c can be formed to increase the number of intermeshed portions between the clutch sleeve 12 and the synchronizer ring 13 thereby to decrease the pressure acting on the respective chamfers 12e, 12f of radial projections 12b and 12c. This is useful to enhance the durability of clutch sleeve 12. Furthermore, the gear synchronizer assembly is characterized in that the retainer lugs 14c and 14d of resilient member 14 are inserted into the axial holes 11d and 11e in the annular body portion of hub member 11 to retain the resilient member 14 in place. This is useful to accurately position the axial legs 14b of resilient member 14 for engagement with the radial projections 12b of clutch sleeve 12 and to retain the resilient member 14 in place without causing displacement of the same in a circumferential direction even when applied with severe vibration during travel of the vehicle.

Having now fully set forth both structure and operation of a preferred embodiment of the concept underlying the present invention, various other embodiments as well as certain variations and modifications of the embodiment herein shown and described will obviously occur to those skilled in the art upon becoming familiar with the underlying concept. It is to be understood, therefore, that within the scope of the appended claims, the invention may be practiced otherwise than as specifically set forth herein.

What is claimed is:

1. A gear synchronizer assembly comprising a gear member rotatable on a transmission shaft, a spline piece mounted on a hub portion of said gear member for rotation therewith and being formed at one side thereof with a conical portion and thereon with external spline teeth, a synchronizer ring mounted on the conical portion of said spline piece for frictional engagement therewith, a hub member fixedly mounted on said shaft for rotation therewith and having an annular body portion and an outer cylindrical hub portion encircling said synchronizer ring and formed thereon with external spline teeth, a clutch sleeve encircling the outer cylindrical hub portion of said hub member and having internal spline teeth in continual engagement with the external spline teeth of said hub member, said clutch sleeve being axially shiftable toward and away from said gear member to be engaged at the internal spline teeth thereof with the external spline teeth of said spline piece, and thrust means for thrusting said synchronizer ring toward said spline piece in shifting operation of said clutch sleeve toward said gear member to effect frictional engagement of said synchronizer ring with said spline piece, wherein said clutch sleeve is formed at its inner periphery with at least one internal radial projection axially movable in a corresponding axial groove formed in the outer cylindrical hub portion of said hub member, wherein said thrust means comprises a radially contractible annular resilient member arranged in surrounding relationship with synchronizer ring and axially slidably supported by engagement with the inner circumference of the outer cylindrical hub portion of said hub member, said resilient member having at least one axial leg extending therefrom toward the internal radial projection of said clutch sleeve, each said at least one axial leg having a radial projection arranged between said hub member and aid synchronizer ring to be brought into engagement with the internal radial projection of said clutch sleeve in shifting operation of said clutch sleeve toward said gear member and comprising means to abut against and urge said synchronizer ring toward said spline piece upon engagement with the internal radial projection of said clutch sleeve, the axial leg of said resilient member being further arranged to be compressed radially inwardly by engagement with the internal radial projection of said clutch sleeve, and wherein said annular resilient member is further formed with at least one retainer lug which is circumferentially offset from all of said at least one axial legs and extends from said annular resilient member in an axial direction toward the annular body portion of said hub member and is inserted into an axial hole in the annular body portion of said hub member to retain said resilient member in place in a circumferential direction.

2. A gear synchronizer assembly recited in claim 1, wherein said clutch sleeve is formed at its inner periphery with three circumferentially equi-spaced ones of said internal radial projections, each axially movable in a corresponding said axial groove formed in the outer cylindrical hub portion of said hub member, wherein said annular resilient member is a C-letter shaped resilient member which is formed at opposite ends thereof with a pair of circumferentially spaced ones of said axial legs and at an intermediate portion thereof with an axial leg, said axial legs each extending from said resilient member toward the respective internal radial projections of said clutch sleeve and having a radial projection arranged to be brought into engagement with e the internal radial projections of said clutch sleeve, respectively, and wherein said annular resilient member is further formed with a pair of circumferentially spaced ones of said retainer lugs which extend therefrom toward the annular body portion of said hub member and are each located between the axial legs of said resilient member, each retainer lug being inserted into a corresponding axial hole in the annular body portion of said hub member.

* * * * *